US012206172B2

(12) United States Patent
Wu et al.

(10) Patent No.: US 12,206,172 B2
(45) Date of Patent: Jan. 21, 2025

(54) REFLECTION APPARATUS USED FOR BASE STATION ANTENNA AND BASE STATION ANTENNA

(71) Applicant: HUAWEI TECHNOLOGIES CO., LTD., Shenzhen (CN)

(72) Inventors: Wentao Wu, Shenzhen (CN); Fangjun Qin, Madrid (ES); Wenbin Huang, Dongguan (CN); Lianhong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 18/071,855

(22) Filed: Nov. 30, 2022

(65) Prior Publication Data

US 2023/0094536 A1 Mar. 30, 2023

Related U.S. Application Data

(63) Continuation of application No. PCT/CN2021/095908, filed on May 26, 2021.

(30) Foreign Application Priority Data

Jun. 1, 2020 (CN) ......................... 202010483822.5

(51) Int. Cl.
*H01Q 19/10* (2006.01)
*H01Q 1/24* (2006.01)
*H01Q 15/14* (2006.01)

(52) U.S. Cl.
CPC ............ *H01Q 19/10* (2013.01); *H01Q 1/246* (2013.01); *H01Q 15/14* (2013.01)

(58) Field of Classification Search
None
See application file for complete search history.

(56) References Cited

U.S. PATENT DOCUMENTS 6,034,649 A * 3/2000 Wilson .................... H01Q 9/28 343/797
9,559,419 B2 1/2017 Beausang
2011/0086600 A1 4/2011 Muhammad
2012/0139810 A1 6/2012 Faraone et al.
(Continued)

FOREIGN PATENT DOCUMENTS

CN 203386906 U 1/2014
CN 203787553 U 8/2014
(Continued)

*Primary Examiner* — Jany Richardson
(74) *Attorney, Agent, or Firm* — Maier & Maier, PLLC

(57) ABSTRACT

A reflection apparatus includes a base plate, where one side is used to dispose a radiation unit, and the other side is used to dispose a feeding network; a first side plate and a second side plate that are separately connected to the base plate and that are disposed opposite to each other, where the first side plate and the second side plate each extend relative to the base plate and toward the side used to dispose the feeding network; a first return plate connected to the first side plate, where the first return plate extends relative to the first side plate and toward a direction of the feeding network; and a second return plate connected to the second side plate, where the second return plate extends relative to the second side plate and toward the direction of the feeding network.

20 Claims, 5 Drawing Sheets

(56) References Cited

U.S. PATENT DOCUMENTS

| | | | | |
|---|---|---|---|---|
| 2018/0248256 | A1* | 8/2018 | Xiao | H01Q 3/44 |
| 2020/0220252 | A1* | 7/2020 | Xiao | H01Q 21/26 |
| 2021/0384641 | A1* | 12/2021 | Tang | H01Q 21/08 |

FOREIGN PATENT DOCUMENTS

| | | | |
|---|---|---|---|
| CN | 105048066 | A | 11/2015 |
| CN | 205303687 | U | 6/2016 |
| CN | 206673115 | U | 11/2017 |
| CN | 207994062 | U | 10/2018 |
| CN | 111327345 | A | 6/2020 |
| WO | 2018212825 | A1 | 11/2018 |
| WO | 2020010039 | A1 | 1/2020 |
| WO | 2020086303 | A1 | 4/2020 |

* cited by examiner

REFLECTION APPARATUS USED FOR BASE STATION ANTENNA AND BASE STATION ANTENNA

CROSS-REFERENCE TO RELATED APPLICATIONS

This application is a continuation of International Application No. PCT/CN2021/095908, filed on May 26, 2021, which claims priority to Chinese Patent Application No. 202010483822.5, filed on Jun. 1, 2020. The disclosures of the aforementioned applications are hereby incorporated by reference in their entireties.

TECHNICAL FIELD

The embodiments relate to the field of radio communications technologies, and a reflection apparatus for a base station antenna.

BACKGROUND

A base station antenna is an important component of a base station and is configured to transmit or receive an electromagnetic wave. The base station antenna mainly includes a reflection apparatus, a radiation unit, and a feeding network. The reflection apparatus is a platform that carries the radiation unit and the feeding network. A size and shape of the reflection apparatus have significant impact on various performance indicators of the base station antenna such as radiation performance.

Therefore, improving the performance indicator of the base station antenna is a problem that needs to be resolved as soon as possible.

SUMMARY

The embodiments may provide a reflection apparatus and a base station antenna, to effectively improve radiation performance of the antenna.

According to a first aspect, an embodiment may provide a reflection apparatus used for a base station antenna, including: a base plate, where one side of the base plate is used to dispose a radiation unit, and the other side of the base plate is used to dispose a feeding network; a first side plate and a second side plate that are separately connected to the base plate and that are disposed opposite to each other, where the first side plate and the second side plate each extend relative to the base plate and toward the side used to dispose the feeding network; a first return plate connected to the first side plate, where the first return plate extends relative to the first side plate and toward a direction of the feeding network; and a second return plate connected to the second side plate, where the second return plate extends relative to the second side plate and toward the direction of the feeding network.

A front-to-back ratio in radiation performance of the base station antenna and reliability of reflection performance may be effectively improved.

The first side plate may be provided with a through hole along a longitudinal direction of the first side plate; and/or the second side plate may be provided with a through hole along a longitudinal direction of the second side plate. The longitudinal direction of the first side plate and the longitudinal direction of the second side plate are the same as a disposing direction of the radiation unit.

The first side plate and/or the second side plate are/is provided with a through hole, to further improve front-to-back ratio performance of the base station antenna.

The first return plate may be provided with a through hole along a longitudinal direction of the first return plate; and/or the second return plate may be provided with a through hole along a longitudinal direction of the second return plate. The longitudinal direction of the first return plate and the longitudinal direction of the second return plate are the same as the disposing direction of the radiation unit.

The first return plate and/or the second return plate are/is provided with a through hole, to further improve front-to-back ratio performance of the base station antenna.

The reflection apparatus may further include a third side plate and a fourth side plate that are separately connected to the base plate and that are disposed opposite to each other, and the third side plate and the fourth side plate may each extend relative to the base plate and toward the side used to dispose the radiation unit.

The third side plate and the fourth side plate are disposed, to further improve the front-to-back ratio performance of the base station antenna.

A through hole may be disposed along a longitudinal direction of the third side plate and/or a longitudinal direction of the fourth side plate, and the longitudinal direction of the third side plate and the longitudinal direction of the fourth side plate may be the same as the disposing direction of the radiation unit. In this way, the front-to-back ratio performance of the base station antenna can be further improved.

A value range of an included angle θ1 between the first side plate and the base plate and toward the feeding network may be $0° < θ1 \le 90°$, and a value range of an included angle θ2 between the second side plate and the base plate and toward the feeding network may be $0° < θ2 \le 90°$. In this way, it is ensured that a width (a length of a side perpendicular to the disposing direction of the radiation unit) of the base plate does not increase, so that both convenience of installing the base station antenna and a weight of the base station antenna may be considered when the reflection performance of the base station antenna is improved.

A value range of an included angle β1 between the first side plate and the first return plate and toward the feeding network may be $0° < β1 < 180°$, and a value range of an included angle β2 between the second side plate and the second return plate and toward the feeding network may be $0° < B2 < 180°$.

Flexibility of the reflection apparatus may be improved.

The through hole on the first side plate may be a plurality of rectangular through holes, a side of the rectangular through hole along the longitudinal direction of the first side plate is L1, a side perpendicular to L1 is w1, a distance between the plurality of rectangular through holes may be k1, $0.3λ \le L1 \le 0.8λ$, $0.01λ \le w1 \le λ$, $0.3λ \le k1 \le 0.8λ$, and λ may be an operating wavelength of a center frequency in an operating frequency band of the radiation unit; or the through hole on the first side plate may be a plurality of serpentine through holes.

The through hole on the second side plate may be a plurality of rectangular through holes, a side of the rectangular through hole along the longitudinal direction of the second side plate may be L2, a side perpendicular to L1 is w2, a distance between the plurality of rectangular through holes may be k2, $0.3λ \le L2 \le 0.8λ$, $0.01λ \le w2 \le 7$, $0.3λ \le k2 \le 0.8λ$, and λ may be the operating wavelength of the center frequency in the operating frequency band of the radiation unit; or the through hole on the second side plate may be a plurality of serpentine through holes.

The through hole on the first return plate may be a plurality of rectangular through holes, a side of the rectangular through hole along the longitudinal direction of the first return plate may be L3, a side perpendicular to L3 may be w3, a distance between the plurality of rectangular through holes may be k3, $0.3\lambda \le L3 \le 0.8\lambda$, $0.01\lambda \le w3 \le \lambda$, $0.3\lambda \le k3 \le 0.8\lambda$, and $\lambda$ may be the operating wavelength of the center frequency in the operating frequency band of the radiation unit; or the through hole on the first return plate may be a plurality of serpentine through holes.

The through hole on the second return plate may be a plurality of rectangular through holes, a side of the rectangular through hole along the longitudinal direction of the second return plate may be L4, a side perpendicular to L2 may be w4, a distance between the plurality of rectangular through holes may be k4, $0.3\lambda \le L2 \le 0.8\lambda$, $0.01\lambda \le w4 \le \lambda$, $0.3\lambda \le k4 \le 0.8\lambda$, and $\lambda$ may be the operating wavelength of the center frequency in the operating frequency band of the radiation unit; or the through hole on the second return plate may be a plurality of serpentine through holes.

When the through hole is a serpentine through hole, a resonant size can be equivalently extended, and a frequency band range wider than that obtained in a case of the rectangular through hole can be obtained.

An integral molding manner or a coupling connection manner may be selected as each of a connection manner of the base plate and the first side plate, a connection manner of the base plate and the second side plate, a connection manner of the first side plate and the first return plate, and a connection manner of the second side plate and the second return plate. The coupling connection manner includes a non-metal contact manner and a metal contact manner.

According to a second aspect, an embodiment may provide a base station antenna, including a radiation unit, a feeding network, and the reflection apparatus in the first aspect.

It should be understood that beneficial effects obtained in feasible implementations corresponding to the second aspect are similar. Details are not described again.

DETAILED DESCRIPTION OF THE EMBODIMENTS

Figure 1:
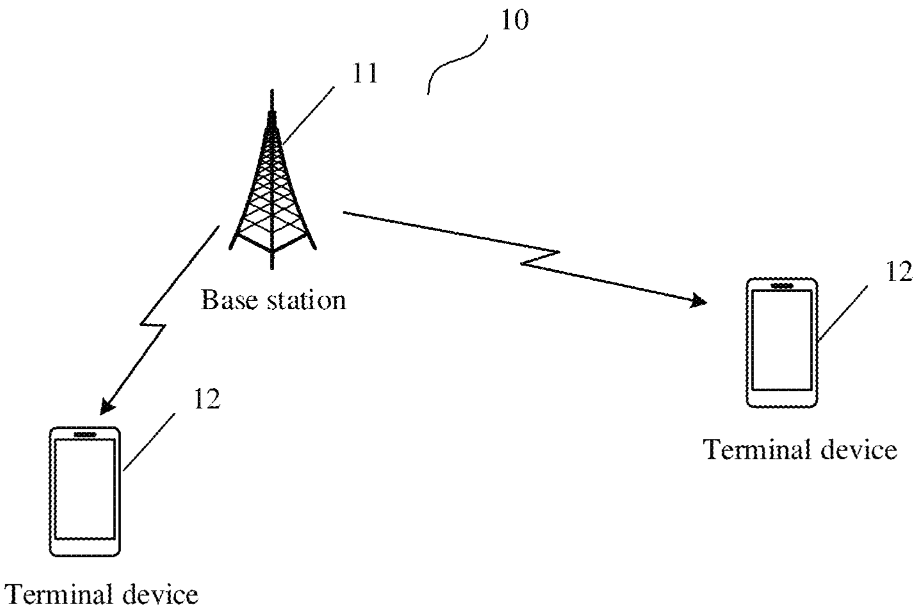
FIG. 1 is a diagram of an architecture of a communications system according to an embodiment.

An embodiment may provide a wireless communications system. FIG. 1 is a schematic diagram of an architecture of a wireless communications system according to an embodiment. As shown in FIG. 1, a wireless communications system 10 may include a base station 11 and a terminal device 12. The base station 11 may communicate with the terminal device 12. It should be noted that the base station and the terminal device included in the wireless communications system in FIG. 1 are merely examples. In this embodiment, a type and a quantity of network elements further included in the wireless communications system, and a connection relationship between network elements are not limited thereto.

The wireless communications system may be a 4th generation (4G) communications system, for example, a long term evolution (LTE) system, a 4.5G communications system, for example, an advanced LTE system, a 5G communications system, for example, a new radio (NR) system, a system in which a plurality of communications systems are converged, or a future evolved communications system.

The base station 11 in FIG. 1 may be a device, on an access network side, configured to support the terminal device to access the wireless communications system, for example, may be an evolved NodeB (eNB) in a communications system of a 4G access technology, a next generation NodeB (gNB) in a communications system of a 5G access technology, a transmission and reception point (TRP), a relay node, or an access point (AP).

The terminal device 12 in FIG. 1 may be a device that provides a voice or data connectivity to a user, for example, may also be referred to as user equipment (UE), a mobile station, a subscriber unit, a station, or terminal equipment (TE). The terminal device may be a cellular phone, a personal digital assistant (PDA), a wireless modem, a handheld device, a laptop computer, a cordless phone, a wireless local loop (WLL) station, a tablet computer (pad), or the like. With development of a wireless communications technology, a device that may access the wireless communications system, that may communicate with a network side of the wireless communications system, or that communicates with another device by using the wireless communications system may be the terminal device in this embodiment, for example, a terminal and a vehicle in intelligent transportation, a household device in smart home, an electric meter reading instrument in smart grid, a voltage monitoring instrument, an environment monitoring instrument, a video surveillance instrument in an intelligent security network, or a cash register. In this embodiment, the terminal device may communicate with the base station. The terminal may be statically fixed or may be mobile.

In a radiation performance indicator of a base station antenna, a front-to-back ratio (FBR) may be a very important indicator. The FBR is defined as follows: A ratio of power density in a forward maximum radiation direction of the base station antenna to power density in a backward maximum radiation direction within a range of +30 degrees) (° or a ratio of a maximum level of a front lobe to a maximum level of a rear lobe in a radiation pattern of the base station antenna. The FRB reflects a forward radiation capability of the base station, in other words, a backward interference suppression capability. A value of the FBR ratio determines directional radiation and/or receiving performance of the base station antenna. For example, a larger front-to-back ratio indicates smaller backward radiation of the base station antenna, namely, higher forward radiation performance of the base station antenna. A reflection apparatus may exert great impact on the FRB of the base station antenna and may help improve the FBR of the base station antenna to an extent.

Figure 2:
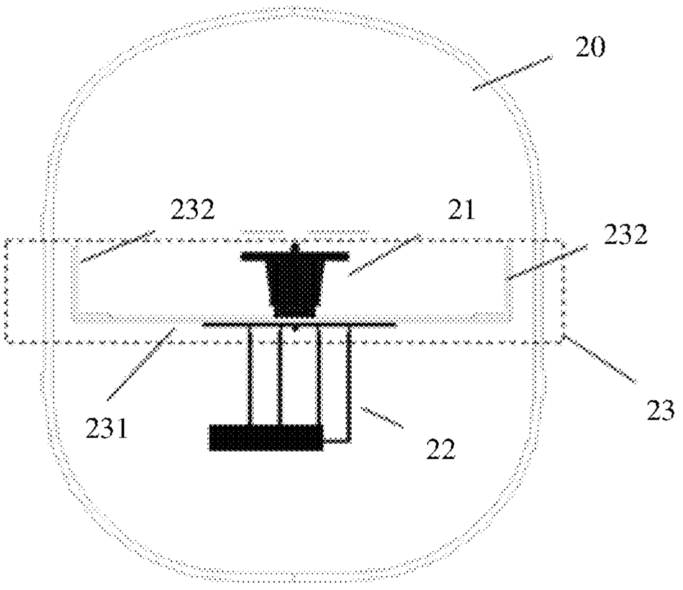
FIG. 2 is a schematic diagram of a structure of a base station antenna according to an embodiment.

FIG. 2 is a schematic diagram of a structure of a base station antenna in the conventional technology. In FIG. 2, a base station antenna 20 includes a radiation unit 21, a feeding network 22, and a reflection apparatus 23. The reflection apparatus includes a base plate 231 and a side plate 232 that is connected to the base plate 231 and that extends toward one side of the radiation unit 21. The reflection apparatus 23 may control a direction of radiant energy of the radiation unit 21 to an extent, to reduce backward radiation. However, with development of a wireless communications technology, to obtain better cell signal coverage, a higher requirement is imposed on a front-to-back ratio, to help improve the reflection apparatus.

The embodiments may provide a reflection apparatus and a base station antenna including the reflection apparatus, to effectively help the base station antenna improve a performance indicator of a front-to-back ratio.

Figure 3:
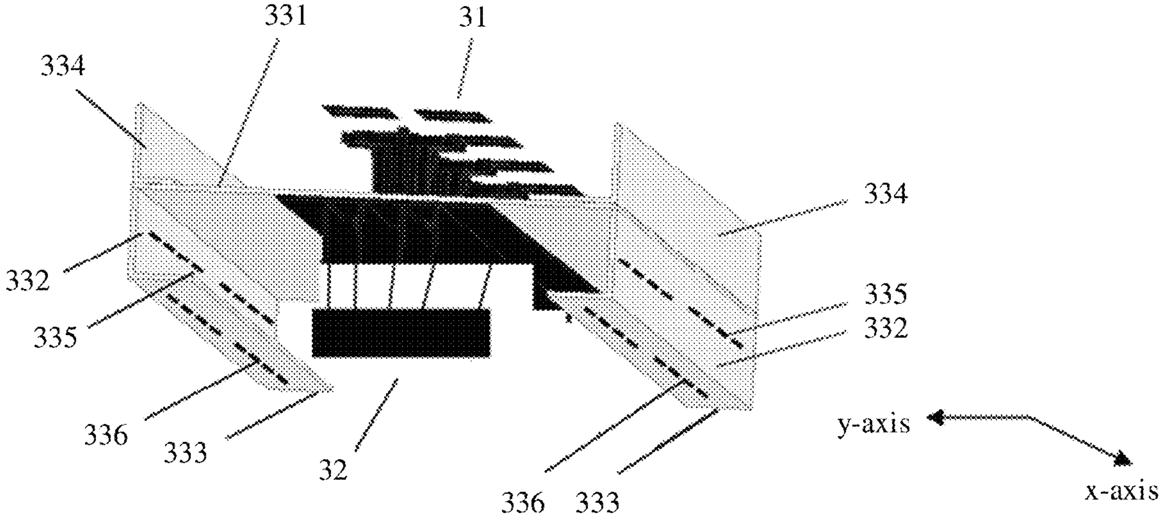
FIG. 3 is a schematic three-dimensional diagram of a base station antenna according to an embodiment.

FIG. 3 is a schematic three-dimensional diagram of a base station antenna according to an embodiment. The base station antenna includes a radiation unit 31, a feeding network 32, and a reflection apparatus 33. The reflection apparatus 33 further includes a base plate 331, a side plate 332 connected to the base plate 331, and a return plate 333 connected to the side plate 332.

The side plate 332 extends relative to the base plate 331 and toward a side used for disposing the feeding network 32. In an implementation, there may be two side plates 332, the two side plates 332 are disposed opposite to each other (namely, face to face) on two sides along a longitudinal direction of the base plate 331 and included angles θ1 and θ2 are separately formed between the base plate 331 and the side plates 332 and toward a side of the feeding network 32. The longitudinal direction of the base plate 331 is a disposing direction of the radiation unit 31, for example, an x-axis direction in FIG. 3. Value ranges of θ1 and θ2 are respectively $0° < \theta 1 \leq 90°$ and $0° < \theta 2 \leq 90°$. The base plate 331 and the side plate 332 may be connected in an integral molding manner. In other words, the base plate 331 and the side plate 332 are formed by stamping a metal plate. The base plate 331 and the side plate 332 may alternatively be connected in a coupling manner. For example, the base plate 331 and the side plate 332 are connected by disposing a non-metal component, to form a gap S. Optionally, 0.5 mm≤S≤0.8 mm. Alternatively, the return plate 333 and the side plate 332 are connected in a riveting manner.

The return plate 333 extends relative to the side plate 332 and toward a direction of the feeding network 32. In an implementation, there may be two return plates 333, and the two return plates 333 are respectively connected to the two side plates 332 along a longitudinal direction of the two side plates 332. Included angles between the return plates 333 and the side plates 332 and toward the feeding network 32 are respectively β1 and β2. The longitudinal direction of the side plate 332 is the longitudinal direction of the base plate 331 and is also the disposing direction of the radiation unit 31, for example, the x-axis direction in FIG. 3. Value ranges of β1 and β2 are respectively $0° < \beta 1 < 180°$ and $0° < \beta 2 < 180°$. The return plate 333 and the side plate 332 may be connected in an integral molding manner or connected in a coupling manner. For example, the return plate 333 and the side plate 332 are connected by disposing a non-metal component, to form a gap S. Herein, 0.5 mm≤S≤0.8 mm. Alternatively, the return plate 333 and the side plate 332 are connected in a riveting manner.

In an implementation, the side plate 332 is provided with a through hole 335 in the longitudinal direction of the side plate 332, namely, in the x-axis direction. There may be a plurality of through holes.

In an implementation, the return plate 333 is provided with a through hole 336 in the longitudinal direction of the return plate 333, namely, in the x-axis direction. There may be a plurality of through holes.

The side plate 332 and/or the return plate 333 are/is provided with a through hole, to further improve an FBR of the base station antenna and improve radiation performance of the antenna.

Compared with a reflection apparatus in the conventional technology, the reflection apparatus provided in this embodiment does not need to extend outwards relative to a width side of the base plate (namely, a side perpendicular to the longitudinal direction of the base plate), to effectively improve FBR performance of the base station antenna and reliability of reflection performance, so that convenience of installing the base station antenna is considered when radiation performance of the base station antenna is improved.

In an implementation, a width P (in a y-axis direction) of the base plate 331 is $0.05\lambda \leq P \leq 0.5\lambda$, and λ is an operating wavelength of a center frequency in an operating frequency band of the radiation unit 31.

In an implementation, the reflection apparatus 33 further includes a side plate 334 connected to the base plate 331. The side plate 334 extends relative to the base plate 331 and toward a side used for disposing the radiation unit 31. There are two side plates 334. The two side plates 334 are disposed opposite to each other on two sides along the longitudinal direction of the base plate 331. For example, an included angle of 90° is formed between each of the two side plates 334 and the base plate 331.

The side plate 334 may be disposed to further improve an FBR of the base station antenna.

In an implementation, a length of the side plate 332 along the longitudinal direction (the x-axis direction) of the side plate 331 is the same as a length of the base plate 331 along the longitudinal direction (the x-axis direction) of the base plate 332, and a length of the return plate 333 along the longitudinal direction (the x-axis direction) of the return plate 333 is the same as a length of the side plate 332 along the longitudinal direction (the x-axis direction) of the side plate 332.

It should be noted that an apparatus including the base plate 331, the side plate 332, and the return plate 333 may be referred to as a return choke plate. The through hole disposed on the side plate 332 and/or the return plate 333 may also be referred to as a choke seam.

Figure 4:
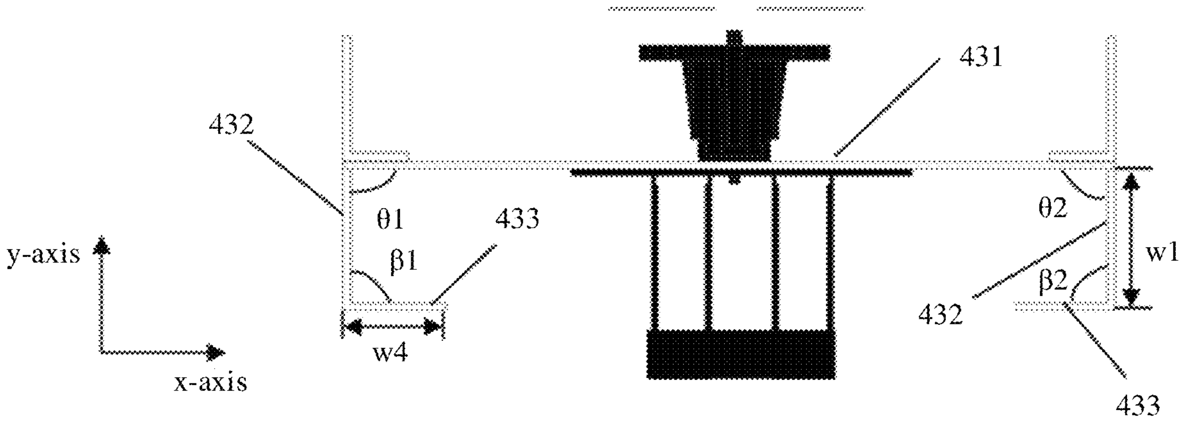
FIG. 4 is a front view of a base station antenna according to an embodiment.

FIG. 4 is a front view of a base station antenna according to an embodiment. This embodiment may be based on the embodiment in FIG. 3. Further, it can be understood that in this case, θ1=θ2=90°. In other words, a right angle is formed between a base plate 431 and a side plate 432. β1=β2=90°. In other words, a right angle is formed between the side plate 432 and a return plate 433. A length of the side plate 432 in a y-axis direction (which may be referred to as a height of the side plate 432) is w1. Optionally, a value range of w1 is $0.01\lambda \leq w1 \leq \lambda$. A length of the return plate 433 along an x-axis direction (which may be referred to as a width of the return plate 433) is w4. Optionally, a value range of w4 is $0.01\lambda \leq w4\lambda$.

Figure 5:
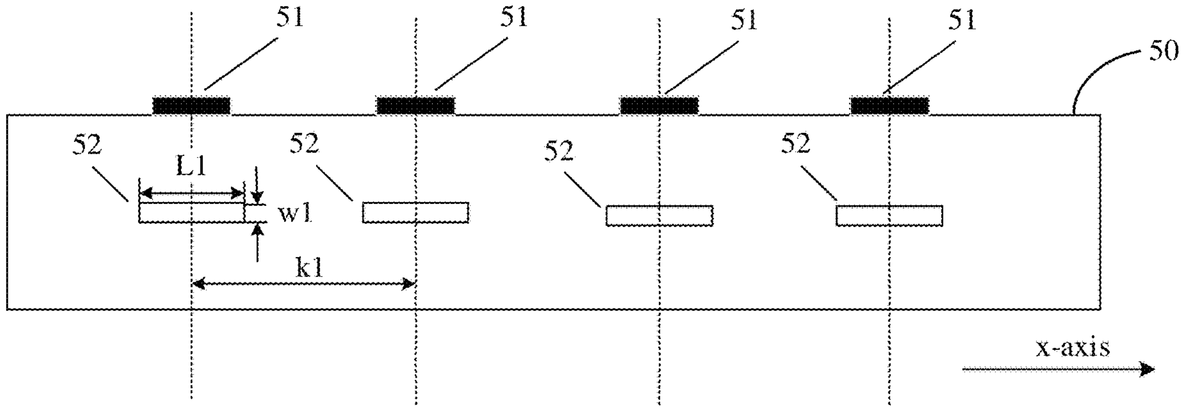
FIG. 5 is a front view of a side plate according to an embodiment.

FIG. 5 is a front view of the side plate 332 and/or the side plate 432 in the foregoing embodiments according to an embodiment. This embodiment may be based on one or more of the foregoing embodiments, to provide more detailed descriptions of the side plate 332 and/or the side plate 432 in the foregoing embodiments. An x-axis direction (a longitudinal direction of a side plate 50) in FIG. 5 is the longitudinal direction of the base plate 331 (or the side plate 332) in the embodiment in FIG. 3, and a radiation unit 51 is disposed along the longitudinal direction. There are four through holes 52 in FIG. 5. It should be noted that a quantity of through holes 52 in FIG. 5 is merely used as an example for illustration and does not impose any limitation on a quantity of through holes on the side plate in this embodiment. Optionally, the quantity of through holes on the side plate 50 is the same as a quantity of radiation units 51 included in the base station antenna, and a center line of the through hole 52 and a center line of the radiation units 51 may overlap, as shown in FIG. 5. The through hole 52 may be a rectangular through hole, a side of the through hole 52 along the longitudinal direction of the side plate 50 is L1, a side perpendicular to L1 is w1, and a distance between two adjacent through holes (namely, a distance between center lines of the two through holes) is k1. Herein, L1, w1, and k1 may be set to $0.3\lambda \le L1 \le 0.8\lambda$, $0.01\lambda \le w1 \le \lambda$, and $0.3\lambda \le k1 \le 0.8\lambda$. Optionally, an arrangement direction of the through hole 52 is the same as the x-axis direction (the longitudinal direction of the side plate 50), or is parallel to a side of the side plate 50 along the longitudinal direction (the x-axis direction).

Figure 6:
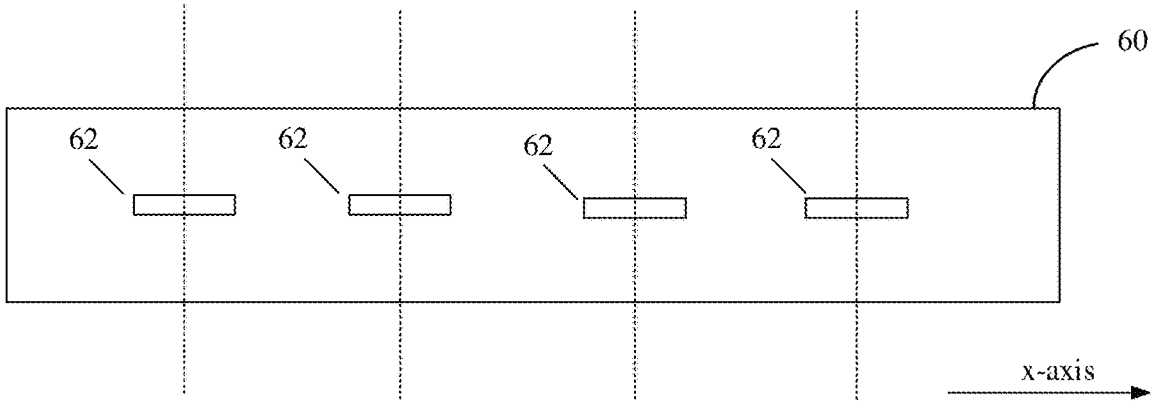
FIG. 6 is a front view of a return plate according to an embodiment.

FIG. 6 is a front view of the return plate in the foregoing embodiments according to an embodiment. This embodiment may be based on one or more of the foregoing embodiments, to provide more detailed descriptions of the return plate 333 and/or the return plate 433 in the foregoing embodiments. An x-axis direction in FIG. 6 is the longitudinal direction of the base plate 331 (or the side plate 332) in the embodiment in FIG. 3. A return plate 60 is provided with a through hole 61. There are four through holes 62 in FIG. 6. It should be noted that a quantity of through holes in FIG. 6 is merely used as an example for illustration and does not impose any limitation on a quantity of through holes on the side plate in this embodiment. Optionally, the quantity of through holes on the return plate 60 is the same as the quantity of through holes included on the side plate 50 in the embodiment of FIG. 5. The through hole 61 may be a rectangular through hole, and a center line (an extension line) of the through hole 61 may intersect with a center line (an extension line) of the through hole 52 in the embodiment in FIG. 5. A value range of a size of the through hole 61 and a value range of a distance between two adjacent through holes 61 may be respectively the same as a value range of a size of the through hole 52 and a value range of the distance between the two adjacent through holes 52 in the embodiment in FIG. 5. In an implementation, the size of the through hole 61 and the distance between the two adjacent through holes 61 are respectively the same as the size of the through hole 52 and the distance between the two adjacent through holes 52 in the embodiment in FIG. 5. Optionally, an arrangement direction of the through hole 62 is the same as the x-axis direction (a longitudinal direction of the return plate 60) or is parallel to a side of the return plate 60 along the longitudinal direction (the x-axis direction).

Figure 7:
FIG. 7 is a schematic diagram of a serpentine through hole according to an embodiment.

Both the example through holes in the embodiments in FIG. 5 and FIG. 6 are rectangular through holes. Optionally, the through holes may alternatively be serpentine through holes. For example, FIG. 7 shows an implementation of a serpentine through hole. It should be noted that persons skilled in the art can understand a meaning of a serpentine. This is not limited to the example implementations in the embodiments. When the serpentine through hole is used, a resonant size may be equivalently extended, and a frequency band range wider than that obtained in a case of the rectangular through hole may be obtained.

Based on the embodiments in FIG. 5 to FIG. 7, FIG. 8 is a front view of a base station antenna 80 including the foregoing mentioned reflection apparatus according to an embodiment. The base station antenna includes a radiation unit 81, a feeding network 82, and a reflection apparatus 83. The reflection apparatus 83 includes a base plate 831, a pair of side plates 832 that are connected to the base plate 831, that extend relative to the base plate 831 and toward the feeding network 82, and that form included angles of 90° with the base plate 831, and a pair of return plates 833 that are respectively connected to the side plates 832, that extend relative to the side plates 832 and toward the feeding network 82, and that respectively form included angles of 90° with the side plates 832. The reflection apparatus 83 further includes a pair of side plates 834 that are connected to the base plate 831, that extend relative to the base plate 831 and toward the radiation unit 81, and that form included angles of 90° with the base plate 831.

Optionally, in the foregoing embodiments, the base station antenna operates on an operating frequency band of 1695 megahertz to 2690 megahertz (MHz).

Figure 8:
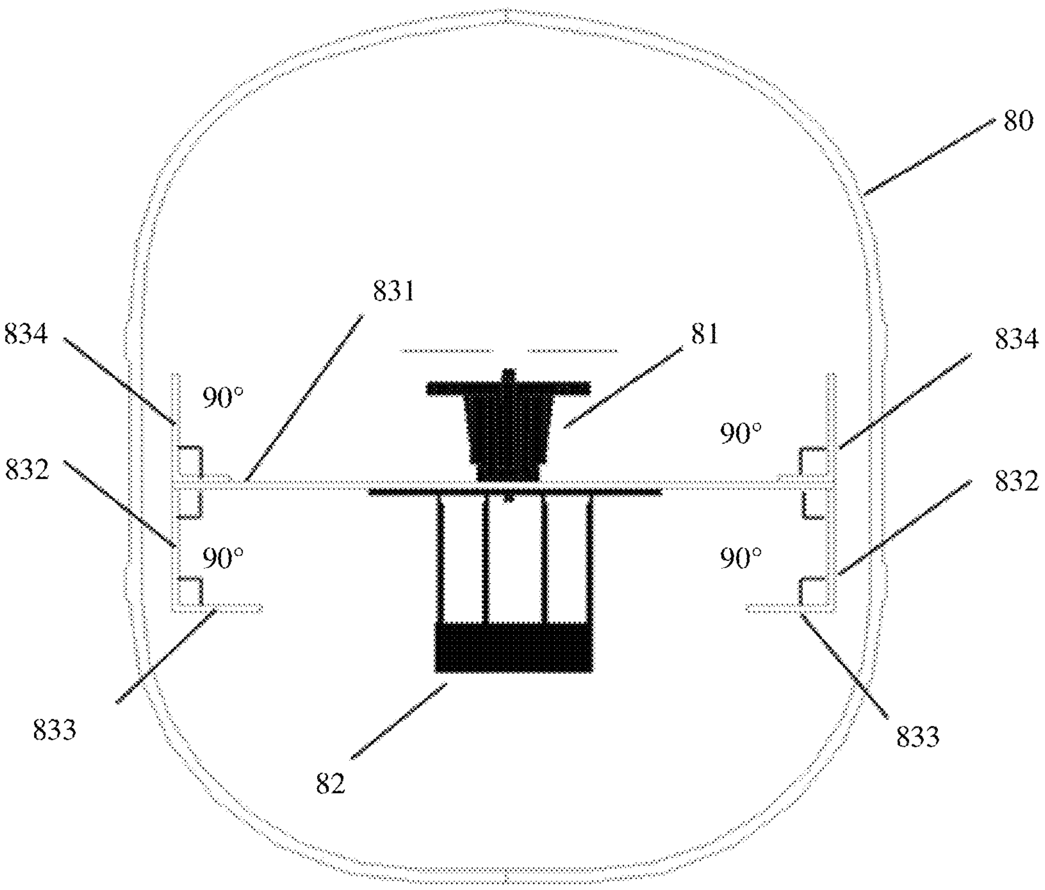
FIG. 8 is a schematic diagram of a structure of a base station antenna according to an embodiment.
Figure 9:
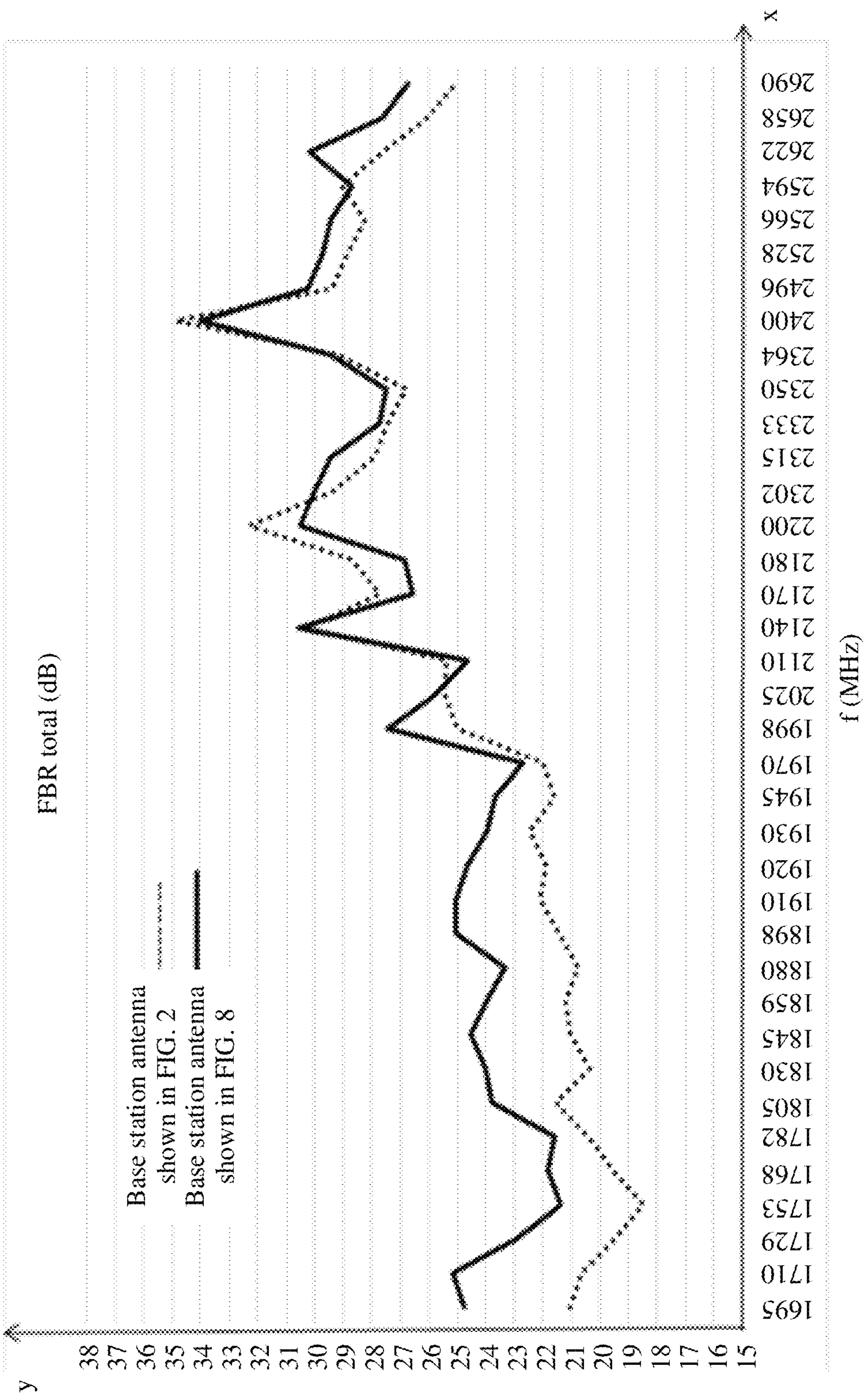
FIG. 9 is a diagram of a comparison between front-to-back ratios according to an embodiment.

FIG. 9 is a diagram of a comparison between FBR values obtained by respectively performing FBR indicator testing on the base station antenna shown in FIG. 2 and the antenna base station shown in FIG. 8 by using an antenna far-field testing system. In FIG. 9, a horizontal axis represents an operating frequency band of the base station antenna, and a vertical axis represents an FBR value. A dashed line in the figure is an FBR value of the base station antenna shown in FIG. 2, and a solid line in the figure is an FBR value of the base station antenna shown in FIG. 8. It can be understood from the figure that, on different frequency bands, FBR values of the base station antenna in the reflection apparatus in the embodiments may be higher than that of a base station antenna used in the conventional technology. For example, a front-to-back ratio may be increased by at least 3 decibels (dB) on the frequency band from 1695 MHz to 2690 MHz.

In the foregoing embodiments, the description of each embodiment has respective focuses. For a part that is not described in detail in an embodiment, refer to related descriptions in other embodiments.

It should be noted that in the embodiments, a term "at least one" means one or more, and "a plurality of" means two or more. "And/or" describes an association relationship between associated objects and represents that three relationships may exist. For example, A and/or B may represent the following cases: only A exists, both A and B exist, and only B exists, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, a and b, a and c, b and c, or a, b, and c, and each of a, b, c may be an element, or may be a set including one or more elements.

In the embodiments, "for example", "in some embodiments", "in another embodiment", "in an implementation", or the like is used as an example, an illustration, or a description. Any embodiment described as an "example" should not be explained as being more preferred or having more advantages than another embodiment. Exactly, "for example" is used to present a concept. Terms such as "first"

and "second" in the embodiments are merely used for distinction description and shall not be understood as an indication or implication of relative importance or an indication or implication of an order. In the embodiments, "equal to" may be used together with "greater than" and is applicable to a solution used in a case of "greater than", or may be used together with "less than", or is applicable to a solution used in a case of "less than". It should be noted that, when "equal to" and "greater than" are used together, "equal to" is not used together with "less than", and when "equal to" and "less than" are used together, "equal to" is not used together with "greater than".

It may be clearly understood by persons skilled in the art in the embodiments that, for the purpose of convenient and brief description, for a detailed working process of the foregoing system, apparatus, and unit, refer to a corresponding process in the foregoing method embodiment. Details are not described herein again.

The foregoing embodiments are merely intended for describing rather than limiting them. Although described in detail with reference to the foregoing embodiments, persons of ordinary skill in the art should understand that they may still make modifications to the foregoing embodiments or make equivalent replacements without departing from the spirit and scope of the embodiments.

What is claimed is:

1. A reflection apparatus used for a base station antenna, comprising:

a base plate, wherein one side of the base plate is used to dispose a radiation unit, and the other side of the base plate is used to dispose a feeding network;

a first side plate and a second side plate that are separately connected to the base plate and that are disposed opposite to each other, wherein the first side plate and the second side plate each extend relative to the base plate and toward the side used to dispose the feeding network;

a first return plate connected to the first side plate, wherein the first return plate extends relative to the first side plate and toward a direction of the feeding network; and a second return plate connected to the second side plate, wherein the second return plate extends relative to the second side plate and toward the direction of the feeding network.

2. The reflection apparatus according to claim 1, wherein the first side plate is provided with a through hole along a longitudinal direction of the first side plate; and/or the second side plate is provided with a through hole along a longitudinal direction of the second side plate, wherein the longitudinal direction of the first side plate and the longitudinal direction of the second side plate are the same as a disposing direction of the radiation unit.

3. The reflection apparatus according to claim 1, wherein the first return plate is provided with a through hole along a longitudinal direction of the first return plate;

and/or the second return plate is provided with a through hole along a longitudinal direction of the second return plate, wherein the longitudinal direction of the first return plate and the longitudinal direction of the second return plate are the same as the disposing direction of the radiation unit.

4. The reflection apparatus according to claim 1, wherein the reflection apparatus further comprises:

a third side plate and a fourth side plate that are separately connected to the base plate and that are disposed opposite to each other, and the third side plate and the fourth side plate each extend relative to the base plate and toward the side used to dispose the radiation unit.

5. The reflection apparatus according to claim 1, wherein a value range of an included angle $\theta 1$ between the first side plate and the base plate and toward the feeding network is $0° < \theta 1 \leq 90°$, and a value range of an included angle $\theta 2$ between the second side plate and the base plate and toward the feeding network is $0° < \theta 2 \leq 90°$.

6. The reflection apparatus according to claim 1, wherein a value range of an included angle $\beta 1$ between the first side plate and the first return plate and toward the feeding network is $0° < \beta 1 < 180°$, and a value range of an included angle $\beta 2$ between the second side plate and the second return plate and toward the feeding network is $0° < \beta 2 < 180°$.

7. The reflection apparatus according to claim 2, wherein the through hole on the first side plate is a plurality of rectangular through holes, a side of the rectangular through hole along the longitudinal direction of the first side plate is L1, a side perpendicular to L1 is w1, a distance between the plurality of rectangular through holes is k1, $0.3\lambda \leq L1 \leq 0.8\lambda$, $0.01\lambda \leq w1 \leq \lambda$, $0.3\lambda \leq k1 \leq 0.8\lambda$, and $\lambda$ is an operating wavelength of a center frequency in an operating frequency band of the radiation unit; or the through hole on the first side plate is a plurality of serpentine through holes.

8. The reflection apparatus according to claim 2, wherein the through hole on the second side plate is a plurality of rectangular through holes, a side of the rectangular through hole along the longitudinal direction of the second side plate is L2, a side perpendicular to L2 is w2, a distance between the plurality of rectangular through holes is k2, $0.3\lambda \leq L2 < 0.8\lambda$, $0.01\lambda \leq w2 \leq \lambda$, $0.3\lambda \leq k2 < 0.8\lambda$, and $\lambda$ is the operating wavelength of the center frequency in the operating frequency band of the radiation unit; or the through hole on the second side plate is a plurality of serpentine through holes.

9. The reflection apparatus according to claim 3, wherein the through hole on the first return plate is a plurality of rectangular through holes, a side of the rectangular through hole along the longitudinal direction of the first return plate is L3, a side perpendicular to L3 is w3, a distance between the plurality of rectangular through holes is k3, $0.3\lambda \leq L3 \leq 0.8\lambda$, $0.01\lambda \leq w3 \leq \lambda$, $0.3\lambda \leq k3 \leq 0.8\lambda$, and $\lambda$ is the operating wavelength of the center frequency in the operating frequency band of the radiation unit; or the through hole on the first return plate is a plurality of serpentine through holes.

10. The reflection apparatus according to claim 3, wherein the through hole on the second return plate is a plurality of rectangular through holes, a side of the rectangular through hole along the longitudinal direction of the second return plate is L4, a side perpendicular to L4 is w4, a distance between the plurality of rectangular through holes is k4, $0.3\lambda \leq L4 \leq 0.8\lambda$, $0.01\lambda \leq w4 \leq \lambda$, $0.3\lambda \leq k4 \leq 0.8\lambda$, and $\lambda$ is the operating wavelength of the center frequency in the operating frequency band of the radiation unit; or the through hole on the second return plate is a plurality of serpentine through holes.

11. The reflection apparatus according to claim 1, wherein the base plate and the first side plate are integrally formed, or the base plate is coupled to the first side plate; and the first side plate and the first return plate are integrally formed, or the first side plate is coupled to the return plate.

12. The reflection apparatus according to claim 1, wherein the base plate and the second side plate are integrally formed, or the base plate is coupled to the second side plate; and the second side plate and the second return plate are integrally formed, or the second side plate is coupled to the second return plate.

13. The refection apparatus according to claim 11, wherein coupling connection comprises non-metal contact or metal contact.

14. A base station antenna, comprising:

a radiation unit, a feeding network, and a reflection apparatus, wherein the reflection apparatus comprises:

a base plate, wherein one side of the base plate is used to dispose a radiation unit, and the other side of the base plate is used to dispose a feeding network;

a first side plate and a second side plate that are separately connected to the base plate and that are disposed opposite to each other, wherein the first side plate and the second side plate each extend relative to the base plate and toward the side used to dispose the feeding network;

a first return plate connected to the first side plate, wherein the first return plate extends relative to the first side plate and toward a direction of the feeding network; and a second return plate connected to the second side plate, wherein the second return plate extends relative to the second side plate and toward the direction of the feeding network.

15. The base station antenna according to claim 14, wherein the first side plate is provided with a through hole along a longitudinal direction of the first side plate; and/or the second side plate is provided with a through hole along a longitudinal direction of the second side plate, wherein the longitudinal direction of the first side plate and the longitudinal direction of the second side plate are the same as a disposing direction of the radiation unit.

16. The base station antenna according to claim 14, wherein the first return plate is provided with a through hole along a longitudinal direction of the first return plate; and/or the second return plate is provided with a through hole along a longitudinal direction of the second return plate, wherein the longitudinal direction of the first return plate and the longitudinal direction of the second return plate are the same as the disposing direction of the radiation unit.

17. The base station antenna according to claim 14, wherein the reflection apparatus further comprises:

a third side plate and a fourth side plate that are separately connected to the base plate and that are disposed opposite to each other, and the third side plate and the fourth side plate each extend relative to the base plate and toward the side used to dispose the radiation unit.

18. The base station antenna according to claim 15, wherein the through hole on the first side plate is a plurality of rectangular through holes, a side of the rectangular through hole along the longitudinal direction of the first side plate is L1, a side perpendicular to L1 is w1, a distance between the plurality of rectangular through holes is k1, $0.3\lambda \le L1 \le 0.8\lambda$, $0.01\lambda \le w1 \le 2$, $0.3\lambda \le k1 \le 0.8\lambda$, and $\lambda$ is an operating wavelength of a center frequency in an operating frequency band of the radiation unit; or the through hole on the first side plate is a plurality of serpentine through holes.

19. The base station antenna according to claim 16, wherein the through hole on the first return plate is a plurality of rectangular through holes, a side of the rectangular through hole along the longitudinal direction of the first return plate is L3, a side perpendicular to L3 is w3, a distance between the plurality of rectangular through holes is k3, $0.3\lambda \le L3 < 0.8\lambda$, $0.01\lambda \le w3 \le \lambda$, $0.3\lambda \le k3 \le 0.8\lambda$, and $\lambda$ is the operating wavelength of the center frequency in the operating frequency band of the radiation unit; or the through hole on the first return plate is a plurality of serpentine through holes.

20. A base station, comprising a base station antenna, the base station antenna comprising:

a radiation unit, a feeding network, and a reflection apparatus, wherein the reflection apparatus comprises:

a base plate, wherein one side of the base plate is used to dispose a radiation unit, and the other side of the base plate is used to dispose a feeding network;

a first side plate and a second side plate that are separately connected to the base plate and that are disposed opposite to each other, wherein the first side plate and the second side plate each extend relative to the base plate and toward the side used to dispose the feeding network;

a first return plate connected to the first side plate, wherein the first return plate extends relative to the first side plate and toward a direction of the feeding network; and a second return plate connected to the second side plate, wherein the second return plate extends relative to the second side plate and toward the direction of the feeding network.

* * * * *